United States Patent
Putman et al.

(10) Patent No.: US 9,488,819 B2
(45) Date of Patent: Nov. 8, 2016

(54) AUTOMATIC MICROSCOPIC FOCUS SYSTEM AND METHOD FOR ANALYSIS OF TRANSPARENT OR LOW CONTRAST SPECIMENS

(75) Inventors: Matthew C. Putman, Brooklyn, NY (US); John B. Putman, Celebration, FL (US); Jeffrey S. Archer, Cuyahoga Falls, OH (US); Julie A. Orlando, Massillon, OH (US)

(73) Assignee: Nanotronics Imaging, Inc., Cuyahoga Falls, OH (US)

( * ) Notice: Subject to any disclaimer, the term of this patent is extended or adjusted under 35 U.S.C. 154(b) by 943 days.

(21) Appl. No.: 13/600,962

(22) Filed: Aug. 31, 2012

(65) Prior Publication Data

US 2014/0063222 A1 Mar. 6, 2014

(51) Int. Cl.
*G02B 21/06* (2006.01)
*G02B 21/24* (2006.01)

(52) U.S. Cl.
CPC ................... *G02B 21/244* (2013.01)

(58) Field of Classification Search
None
See application file for complete search history.

(56) References Cited

U.S. PATENT DOCUMENTS

| 4,661,692 | A * | 4/1987 | Kawasaki | 250/201.2 |
|---|---|---|---|---|
| 4,945,220 | A | 7/1990 | Mallory et al. | |
| 7,345,814 | B2 | 3/2008 | Yoneyama et al. | |
| 7,772,535 | B2 * | 8/2010 | Krief et al. | 250/208.1 |
| 8,174,762 | B2 * | 5/2012 | Xu et al. | 359/383 |
| 2003/0184856 | A1 | 10/2003 | Otaki | |
| 2005/0063049 | A1 * | 3/2005 | Steenblik et al. | 359/368 |

OTHER PUBLICATIONS

Michael Spencer, "Fundamentals of Light Microscopy" IUPAB Biophysics Series. pp. 3-7, 1982.
L F McKeogh, et. al, "A low-cost automatic translation and autofocusing system for a microscope" Meas. Sci. Technol. 6(1995) 583-587.
"Perfect Focus System" http://www.nikoninstruments.com/Information-Center/Perfect-Focus-System-PFS, Mar. 31, 2012 9:27 AM.
"OASIS-AF Autofocus Module" www.objectiveimaging.com/Docs/OASIS-AF.pdf, Mar. 31, 2012 9:56 AM.
"Properties of Microscope Objectives" http://www.microscopyu.com/articles/optics/objectiveproperties.htm, May 13, 2012 4:33 PM.
"The Automatic Microscope" http://www.microscopyu.com/articles/livecellimaging/automaticmicroscope.html, May 7, 2012 6:03 PM.
"FocusTrac Laser Auto Focus Systems" http://motionx.thomasnet.com/item/ries-including-focustra-laser-auto-focus-systems/focustrac-laser-auto-focus-systems/item-1004?#, May 7, 2012 6:10 PM.

(Continued)

*Primary Examiner* — Derek S Chapel
(74) *Attorney, Agent, or Firm* — Renner Kenner Greive Bobak Taylor & Weber

(57) ABSTRACT

A microscope system and method empirically determines the boundaries of the depth of field of an objective lens. The system and method are largely automated, with the manipulation of a specimen to be imaged being carried out by processors and associated equipment. Calculations of the empirical depth of field are also likewise automated. Upon empirically determining the boundaries of the depth of field, the specimen, particularly when transparent or translucent, can be accurately imaged at user-defined depths smaller than the depth of field.

14 Claims, 14 Drawing Sheets

(56) References Cited

OTHER PUBLICATIONS

"Prior Scientific—Product Information" http://www.prior.com/productinfo_auto_focusoptions.html, May 7, 2012 6:35 PM.

Frans C.A. Groen, et. al, "A Comparison of Different Focus Functions for Use in Autofocus Algorithms" Cytometry 6:81-91 (1985).

Gabe Chow, et. al, "Nikon Optical Microscope" http://nanomech.me.washington.edu/pdfs/nikon.pdf, UW Nanomech Lab 1-2 (2009).

"NanoSpec Film Thickness Measurement System" http://microlab.berkeley.edu/labmanual/chap8/nanospec.pdf, Mar. 31, 2012 9:13 PM.

"Depth of Field and Depth of Focus" http://www.microscopyu.com/articles/formulasfielddepth.html, May 8, 2012 1:37 PM.

"Objective Working Distance" http://www.microscopyu.com/tutorials/java/workingdistance/index.html, May 8, 2012 3:40 PM.

X. Y. Liu, et. al, "Dynamic evaluation of autofocusing for automated microscopic analysis of blood and pap smear" Journal of Microscopy, vol. 227, Pt 1 2007, pp. 15-23.

* cited by examiner

US 9,488,819 B2

AUTOMATIC MICROSCOPIC FOCUS SYSTEM AND METHOD FOR ANALYSIS OF TRANSPARENT OR LOW CONTRAST SPECIMENS

TECHNICAL FIELD

The present invention generally relates to microscopes and, more particularly, to microscope systems and methods for empirically determining the working distance and depth of focus for an objective lens focusing on a transparent or low contrast specimen. The present invention provides microscope systems and methods that can beneficially focus on a defined depth of a transparent or low contrast specimen.

BACKGROUND OF THE INVENTION

All optical microscopes require a mechanism by which to provide focus in order to clearly image a specimen. In many instances, the system focus depends upon a specimen having visually recognizable features. These features produce necessary contrast for focus. In other instances, the distance to the specimen is determined and the focus set by the known focal length of the objective. Transparent specimens present unique challenges for establishing proper focus, and special techniques known only to highly skilled practitioners in the art are required to improve contrast to a point where proper focusing is possible.

Microscopes are traditionally focused by increasing or decreasing the distance between the microscope objective lens and the specimen until the image appears in focus to the microscopist. The focusing of a microscope is thus typically somewhat subjective, and microscopes must have focus-adjusting capabilities in order to properly visualize surface features of a specimen. Most often, a knob is provided to move either the objective lens or the object stage holding the specimen, in order to adjust the relative distance between the objective lens and the specimen, and the microscopist manipulates this knob until he subjectively believes that the best focus has been reached. Thus, despite the need for ever finer accuracy, the microscopist essentially remains the subjective tool by which focus is subjectively determined.

Technology has taken the subjectivity out the determination of focus by two basic methods. A first method measures the distance between the objective and the specimen by sensing light, such as near-infrared, reflected from the surface of the specimen to provide feedback to automatically control the focus. This type of method is described by Nikon Corporation (Japan). In another method, Nikon also describes the use of reflected sound to measure distance. Laser focus control systems as described by MotionX Corporation (U.S.), for example, in their FocusTrac Laser Auto Focus Systems, and Prior Scientific (U.S.), also facilitate focus by measuring the distance between the objective and the specimen and providing feedback for focus adjustment. U.S. Pat. No. 7,345,814 further describes a laser focus system. In some cases, these methods have difficulty focusing on transparent specimens due to the specimen reflectivity and transparency. These distance measuring methods generally require the addition of hardware and control software to facilitate focus using a standard microscope. U.S. Pat. No. 5,594,235 uses a confocal sensor to optimally measure the height, or Z axis point as it is referred to in the prior art. A given number of z points are pre-determined, and then each is evaluated for reflectance. Due to the varying degrees of reflectance, height at each point of the surface can be determined. While this may be thought of as a tool for topographical measurement, it also guarantees a certain confidence of focus accuracy.

A second known method to focus a microscope is to compare the contrast of an image as the distance between the microscope objective and specimen is increased and decreased. This is basically the method that a microscopist uses to visually determine that a specimen is in focus, as described above. The method is easily automated by capturing the specimen image electronically using a sensor such as, but not limited to, CCD or CMOS sensors. This method is described in detail by Groen and Young, et al, in "A Comparison of Different Focus Functions for Use in Autofocus Algorithms," Cytometry 6:81-91 (1985). However, this method of contrast comparison cannot be used on specimens which are fully transparent or which do not have contrast within the image.

Methods using a microscope's field aperture, F-Stop, are employed to focus upon a specimen. This method is described by Chow and Liu, Nikon Optical Microscope, Basic Operation Procedure, http://nanomech.me.washington.edu/pdfs/nikon.pdf, January 2009, and further described in Nanometrics Incorporated's NanoSpec™ 3000 Lab Manual, NanoSpec Film Thickness Measurement System, Chapter 8.33. In this method, the F-Stop is closed in order to project the F-Stop on the specimen, and the focus is adjusted (i.e., specimen and objective are relatively moved), such that the contrast increases and/or decreases. At the point of greatest contrast, the specimen is considered in-focus and the F-Stop is opened to allow imaging of the specimen.

In microscopic imaging, the specimen is magnified primarily through the objective lens. Each objective lens has an associated depth of field, sometimes also referred to as the depth of focus. Nikon defines depth of field as the distance from the nearest object plane in focus to that of the farthest plane also simultaneously in focus. In microscopy depth of field is very short ranging from approximately 0.2 to 55 micrometers ($\mu m$). It is appreciated that, when imaging a transparent specimen, any object within the depth of field will be imaged. For example, using the data in Ref.6, a 4× objective has a depth of field of 55.5 $\mu m$, and, therefore, when it is focused on a transparent specimen with the nearest in-focus object plane at the surface of the specimen, all objects within the top 55.5 $\mu m$ of the specimen will be imaged. This is not desirable when, for example, the area of interest is only the top 5 $\mu m$ of the specimen. Therefore, there is a need in the art for a microscope system that allows a microscope to be automatically focused on a transparent or translucent specimen at a desired depth, negating, as desired, the remainder of the depth of field of the objective lens. There is a need in the art to provide microscope systems and methods that allow for automatically imaging a transparent or low contrast specimen at a desired depth.

SUMMARY OF INVENTION

A first embodiment of this invention provides a method for empirically determining a boundary of the depth of field of an objective lens of a microscope system, the microscope system having a microscope, an F-stop, and one or more processors, the method comprising the steps of:

placing a focal face of a specimen at a first position outside of the depth of field of the objective lens;

projecting the F-stop onto the focal face at the first position to produce an F-stop projection thereon;

effecting incremental relative movement between the specimen and the objective lens to place the focal face of the specimen at different incremental positions relative to the objective lens and projecting the F-stop to produce an F-stop projection on the focal face at said incremental positions, wherein said step of effecting incremental relative movement brings the focal face to a position at the boundary of the depth of field;

performing a contrast analysis of the image of the F-stop projection at the first position and at said incremental positions, said step of performing a contrast analysis being carried out by said one or more processors and establishing when the focal face is at a position at the boundary of the depth of field.

A second embodiment of this invention provides a method as in the first embodiment, wherein the specimen is transparent and the focal face is chosen from a proximal focal face, relative to the objective lens, and a distal focal face, relative to the objective lens.

A third embodiment of this invention provides a method as in any of the above embodiments, wherein the depth of field has a first boundary WD and a second boundary WD1, wherein WD is the shortest distance that a focal face may be from the objective lens and yet be in clear focus and WD1 is the greatest distance that a focal face may be from the objective lens and yet be in clear focus, and the first position is selected to be a distance of less than 99% of WD or greater than 101% of WD1.

A fourth embodiment of this invention provides a method as in any of the above embodiments, wherein said step of performing contrast analysis establishes when the focal face is at a position at the boundary of the depth of field by comparison of standard deviation of the relative focus of the F-stop projection at multiple incremental positions.

A fifth embodiment of this invention provides a method as in any of the above embodiments, wherein said step of projecting the F-stop is automated by said one or more processors.

A sixth embodiment of this invention provides a method as in any of the above embodiments, wherein said step of effecting incremental relating movement is automated by said one or more processors.

A seventh embodiment of this invention provides a method as in any of the above embodiments, wherein said step of placing is automated by said one or more processors.

An eighth embodiment of this invention provides a method as in any of the above embodiments, wherein the first position is entered by a user of the microscope system.

A ninth embodiment of this invention provides a method as in any of the above embodiments, wherein the objective lens has a manufacturer-stated working distance, and said first position is selected based upon the manufacturer-stated working distance, as entered by a user of the microscope system.

A tenth embodiment of this invention provides a method as in any of the above embodiments, wherein the microscope system further includes an image sensor and the method further comprises: electronically imaging, with the image sensor, the F-stop projection on the focal face at said incremental positions, said step of electronically imaging being automated by said one or more processors.

An eleventh embodiment of this invention provides a method for imaging a transparent specimen at a defined depth below a top focal face or at a defined height above a bottom focal face, the method comprising the steps of:

empirically determining a boundary of the depth of field of an objective lens of a microscope system, the microscope system having a microscope, an F-stop and one or more processors, said step of empirically determining the boundaries comprising the steps of:

placing a focal face of a specimen at a first position outside of the depth of field of the objective lens, projecting the F-stop onto the focal face at the first position to produce an F-stop projection thereon, effecting incremental relative movement between the specimen and the objective lens to place the focal face of the specimen at different incremental positions relative to the objective lens and projecting the F-stop to produce an F-stop projection on the focal face and imaging the image of the F-stop projection on the focal face at said incremental positions, wherein said step of effecting incremental relative movement brings the focal face to a position at the boundary of the depth of field, and performing a contrast analysis of the image of the F-stop projection at the first position and at said incremental positions, said step of performing a contrast analysis being carried out by said one or more processors and establishing when the focal face is at a position at the boundary of the depth of field; and placing a focal face of the transparent specimen within the depth of field based upon the boundary of the depth of field determined in said step of determining a boundary.

A twelfth embodiment of this invention provides a method as in the above eleventh embodiment, wherein the depth of field has a first boundary WD and a second boundary WD1, wherein WD is the shortest distance that a focal face may be from the objective lens and yet be in clear focus and WD1 is the greatest distance that a focal face may be from the objective lens and yet be in clear focus, and said step of placing a focal face of the transparent specimen with the depth of field includes either placing the top focal face closer to the objective than WD1 or placing the bottom focal face further away from the objective than WD.

A thirteenth embodiment of this invention provides a method as in any of the above eleventh through twelfth embodiments, wherein the depth of field has a first boundary WD and a second boundary WD1, wherein WD is the shortest distance that a focal face may be from the objective lens and yet be in clear focus and WD1 is the greatest distance that a focal face may be from the objective lens and yet be in clear focus, and the first position is selected to be a distance of less than 99% of WD or greater than 101% of WD1.

A fourteenth embodiment of this invention provides a method as in any of the above eleventh through thirteenth embodiments, wherein said step of performing contrast analysis establishes when the focal face is at a position at the boundary of the depth of field by comparison of standard deviation of the relative focus of the F-stop projection at multiple incremental positions.

A fifteenth embodiment of this invention provides a method as in any of the above eleventh through fourteenth embodiments, wherein said step of projecting the F-stop is automated by said one or more processors.

A sixteenth embodiment of this invention provides a method as in any of the above eleventh through fifteenth embodiments, wherein said step of effecting incremental relating movement is automated by said one or more processors.

A seventeenth embodiment of this invention provides a method as in any of the above eleventh through sixteenth embodiments, wherein said step of placing is automated by said one or more processors.

An eighteenth embodiment of this invention provides a method as in any of the above eleventh through seventeenth embodiments, wherein the first position is entered by a user of the microscope system.

A nineteenth embodiment of this invention provides a method as in any of the above eleventh through eighteenth embodiments, wherein the objective lens has a manufacturer-stated working distance, and said first position is selected based upon the manufacturer-stated working distance, as entered by a user of the microscope system.

A twentieth embodiment of this invention provides a method as in any of the above eleventh through nineteenth embodiments, wherein the microscope system further includes an image sensor and the method further comprises:

electronically imaging, with the image sensor, the F-stop projection on the focal face at said incremental positions, said step of electronically imaging being automated by said one or more processors.

A twenty-first embodiment of this invention provides a microscope system comprising:

a stage for holding a specimen,
an illumination source,
an objective lens,
a motorized F-stop,
a drive mechanism operable to change the relative position between the specimen and objective lens,
an electronic image sensor,
means to determine the relative focus of the specimen at a given relative position between the specimen and the objective lens,
means to determine a first empirical working distance, WDE, wherein WDE is the closest distance between a focal face of the specimen and the objective lens when that focal face is in focus, as determined by said means to determine the relative focus,
means to determine a second empirical working distance, WDE1, wherein WDE1 is the furthest distance between a focal face of the specimen and the objective lens when that focal face is in focus, as determined by said means to determine the relative focus,
one or more processors controlling the stage, the motorized F-stop, the drive mechanism, and the image sensor, and effecting said means to determine the relative focus, said means to determine WDE and means to determine WDE1, and means to enter a user-defined depth below a focal face or user-defined height above a focal face to be imaged, said one or more processors adapted to move said specimen to an appropriate position to image at said user-defined depth below or height above a focal face, said appropriate position being based on either WDE or WDE1.

A twenty-second embodiment of this invention provides a microscope system as the above twenty-first embodiment, further comprising: means to store a given relative position of the specimen to the objective lens, electronically image the specimen at that relative position and store information respecting the relative focus at that relative position.

A twenty-third embodiment of this invention provides a microscope system as in any of the above twenty-first through twenty-second embodiments, further comprising means to determine WDE and WDE1 employ a standard deviation analysis of the relative focus determined by said means to determine the relative focus.

A twenty-fourth embodiment of this invention provides a microscope system as in any of the above twenty-first through twenty-third embodiments, further comprising an input device communicating with said processor to permit user input of data.

A twenty-fifth embodiment of this invention provides a microscope system as in any of the above twenty-first through twenty-fourth embodiments, further comprising a specimen on said stage, said specimen being transparent.

DETAILED DESCRIPTION OF ILLUSTRATIVE EMBODIMENTS

The invention provides microscope systems and methods to empirically determine working distances and depth of field and allows one to automatically specify the depth of a transparent or low contrast specimen to be imaged. By "transparent" it is to be understood that the specimen allows light to pass therethrough, as opposed to being opaque. Herein, this term is also to be understood as covering translucent specimens, which are semi-transparent, allowing light to pass therethrough, though images may be seen in less detail due to the translucent property. With transparent specimens, this invention provides apparatus and methods for focusing upon objects at different depths within the specimen. This invention improves the accuracy of imaging objects and imperfections in transparent specimens, both at the surface and within different depths (or layers) of the specimen. By "low contrast" it is meant that range of the dark to light in the specimen is very small. This invention improves the accuracy at which objects and imperfections may be viewed in low contrast specimens. In broader aspects, the present invention provides apparatus and methods for empirically determining the working distance and depth of field of a given objective. In some embodiments, the method is significantly automated, with little or no input from one using the microscope system.

Figure 1:
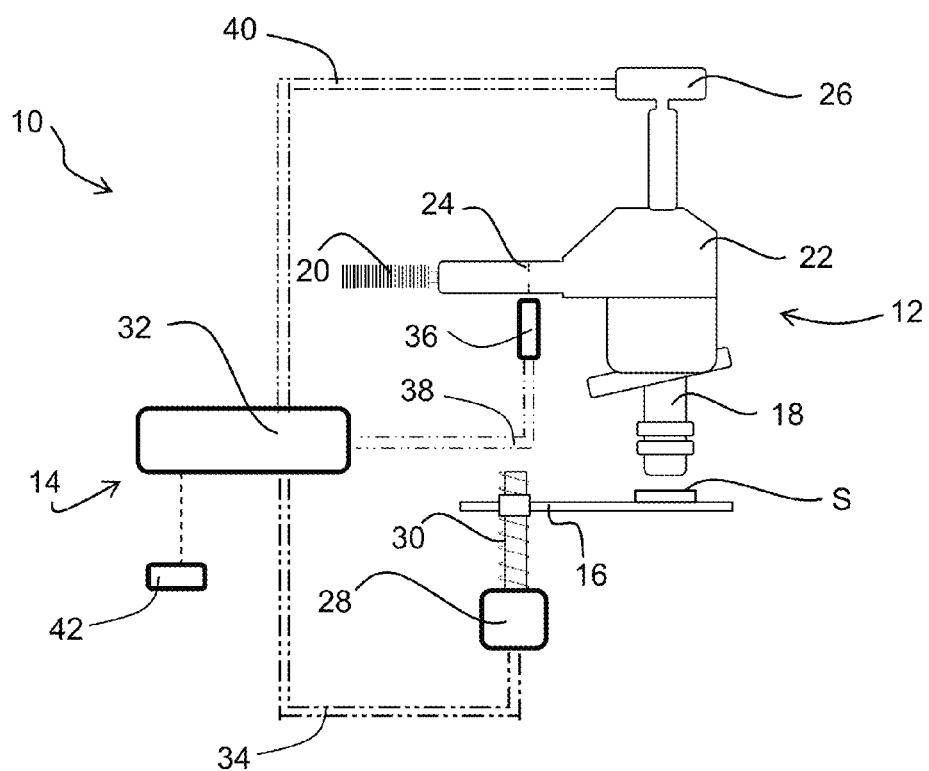
FIG. 1 is a general schematic view of a microscope system in accordance with the present invention.

A typical microscope system is shown in FIG. 1 and designated by the numeral 10. The microscope system 10 includes an optical system 12 for imaging a specimen, and a focus detection system 14 for automatically determining a depth of field. This particular system 10 employs a modified reflected light microscope as the optical system 12, but it should be noted that a transmitted light microscope may be similarly adapted. The optical system 12 includes a specimen stage 16 carrying a specimen S, under an objective lens 18. The optical system 12 further includes a light source 20 and a vertical illuminator 22 for illuminating the specimen S. The optical system 12 also includes an adjustable F-Stop 24. An image sensor 26 receives the image transmitted through the objective lens 18, and the image sensor 26 may be considered as part of the focus detection system 14. The focus detection system 14 also includes a motor 28 and drive mechanism 30 that operate to move the specimen stage 16 (and thus the specimen S thereon) toward and away from the objective lens 18. The drive mechanism 30 is shown as a screw 31 that is rotated by the motor 28 to advance the specimen stage 16, with movement upwardly resulting from rotating the screw 31 in one direction (e.g., clockwise), and movement downwardly resulting from rotating the screw 31 in the opposite direction (e.g., counterclockwise). It will be appreciated that other drive mechanisms can be used, and that it is relative movement of the objective lens 18 and the specimen S that is important, such that drive mechanisms could alternatively or additionally manipulate the microscope to move it relative to the specimen S. The drive mechanism should be such that the stage and thus the specimen thereon can be moved in very small increments, on the order of microns or even more preferably nanometer because the magnitude of the depths of field being empirically determined through the present apparatus and method are typically very small. The motor 28 is controlled by one or more processors 32, communicating with the motor 28 through a cable 34 or other appropriate mechanism, such as wireless communication. The focus detection system 14 also includes a motor 36 to open and close the F-Stop 24, the motor 36 also being controlled by the one or more processors 32, communicating with the motor 36 through a cable 38 or other appropriate mechanism, such as wireless communication. Finally, the processor(s) 32 and the image sensor 26 communicate via cable 40 or other appropriate mechanism, such as wireless communication. An operator input unit 42, such as a keyboard, touch screen monitor or other standard means is available for allowing an operator to input desired controls and data.

Figure 2:
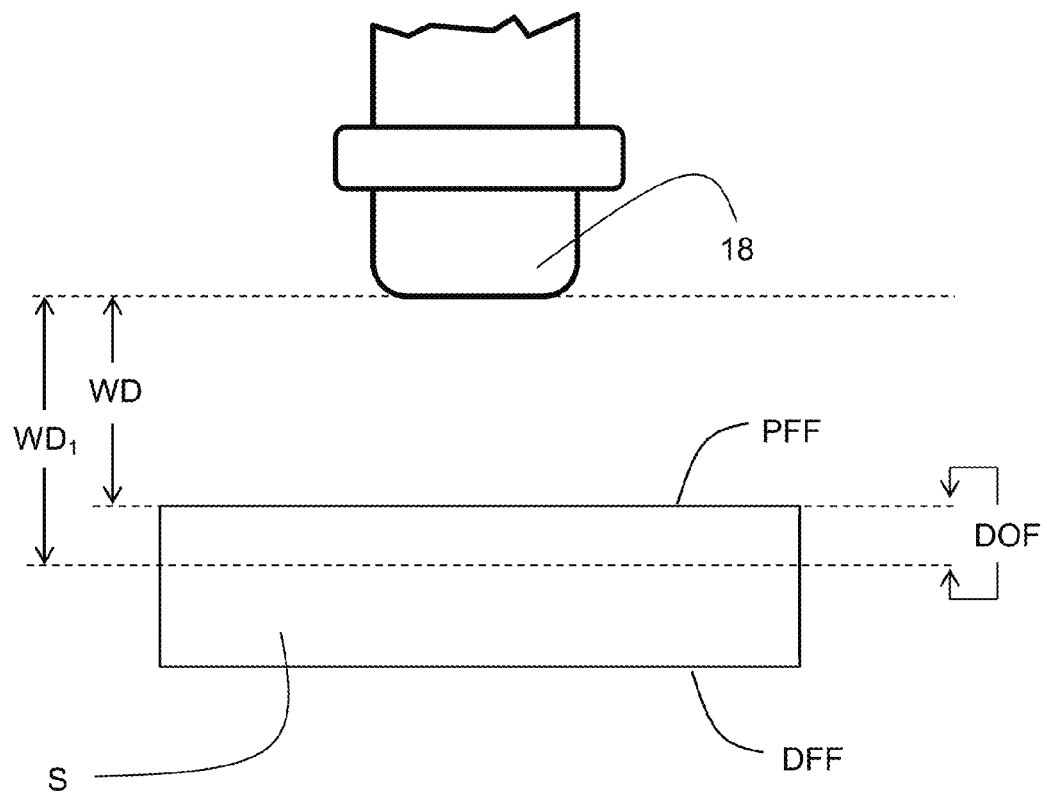
FIG. 2 is a side elevational schematic view showing the working distance and depth of field relationships between the objective lens and a specimen.

The optical components of the apparatus determine the characteristics of the system, notably the magnification, working distance (WD) and depth of field (DOF). The magnification of the example apparatus of FIG. 1 is a function of the objective lens 18. As known, every objective lens is specified with a numerical aperture, NA, as well as a degree of magnification. These specifications of the objective lens and its construction define two critical components of the present invention: the depth of focus, DOF, and working distance, WD. The depth of focus, DOF, and its relation to working distances, WD and $WD_1$, is shown in FIG. 2. The DOF is unique for each different objective lens, and is defined as the difference between the shortest distance that the specimen is from the objective lens to the greatest distance that the specimen is to the objective lens where the image is in clear focus at both positions. For the purposes of disclosing this invention, it is helpful to relate the DOF to working distances, and it is therefore noted, with reference to FIG. 2, that a working distance, WD, is established as the smallest distance between the objective lens 18 and the top surface of the specimen S, where the specimen is in focus. In a similar manner, a working distance, $WD_1$, is established as the largest distance that the objective lens 18 can be from the top surface of the specimen S, with the specimen still being in focus. It can be seen that:

$$DOF = WD_1 - WD, \text{ or}$$

$$DOF = |WD - WD_1|$$

Although the DOF is a feature of the objective lens, it may change due to mechanical components and additional optical components in the apparatus. The actual working distance, although a property of the objective, may also change due to mechanical components and additional optical components in the apparatus. For purpose here $DOF_M$ will refer to the stated depth of focus supplied by the objective lens manufacturer, and $WD_M$, with $WD_{M1}$ being the sum of $WD_M$ and $DOF_M$ (i.e., $WD_M + DOF_M$), will refer to the working distance supplied by the objective lens manufacturer. These are thus given or known values, and it is noted that the present invention provides a method to empirically determine WD and DOF by projecting the F-Stop onto the specimen S and analyzing that projected image while measuring the relative distances $\Delta D$ between the objective lens 18 and specimen S. The empirically determined working distances and depth of field will be denoted herein as $WD_E$ and $WD_{E1}$ and $DOF_E$.

Methods to empirically determine $WD_E$ and $WD_{E1}$ and $DOF_E$ for transparent specimens are shown in FIGS. 3-10. The methods are a bit more limited with low contrast specimens, because they do not permit focusing on both a top and bottom face of the specimen. Methods for low contrast specimens will be more particularly disclosed after disclosure of the methods relating to transparent specimens. Notably, the general concept is the same in each method and involves moving a "focal face" (defined later herein) of the specimen from a position outside of the depth of field into the depth of filed to determine empirically the boundaries of the depth of field, i.e., $DOF_E$, which, as disclosed above, relates to empirically determined working distances $WD_E$ and $WD_{E1}$. Each method is practiced herein to determine both $WD_E$ and $WD_{E1}$ and, from those values, $DOF_E$ can also be determined, but it should be appreciated that the methods herein could be practiced in part and in combination to empirically determine these desired values. For example, one method might be employed to determine $WD_E$ and another to determine $WD_{E1}$, the two methods in combination thereby yielding all desired values, namely $WD_E$ and $WD_{E1}$ and $DOF_E$. This combination of methods is perhaps less desired as it will likely be found to be less efficiently carried out, but, nevertheless, such a combination still provides the advantages of the present invention and thus falls within the scope thereof.

The term "focal face" is employed in disclosing the present methods. For purposes of this disclosure, the term "focal face" is to connote the face of the specimen that is analyzed to determine when an F-stop image projected thereon is in focus and thus within the empirical depth of field. It will be appreciated that, for transparent specimens, the top face or the bottom face can be chosen to serve as the focal face. Indeed, certain methods of the present invention are only practiced on transparent specimens. This will be appreciated more fully through the disclosures below. It should further be noted that the present invention is generally directed to the use of specimens that are thicker than the depth of field of the objective being employed. It will be appreciated that, because DOF is usually very small, in the range of microns, the fact that the specimen is thicker than the depth of field is likely always to occur.

The designation "$\Delta D$" is to be understood as the distance between the objective lens 18 and the focal face of the specimen, and, thus, $\Delta D_1$ and $\Delta D_2$ etc., may be employed to denote specific positions of the focal face.

A first method is shown in FIGS. 3-6. This method generally involves treating the face of the specimen that is nearest the objective lens 18 as the "focal face." This face is identified with the letters PPF in the figures, standing for "proximal focal face." The face that is furthest from the objective lens 18 is identified with the letters DFF, standing for "distal focal face." It will be appreciated that only a transparent specimen will provide a distal focal face DFF, and the use of the distal focal face DFF will be covered herein below. The use of the proximal focal face PFF is first addressed, with the understanding that both transparent specimens and opaque, low contrast specimens will provide a suitable proximal focal face PFF.

Figure 3:
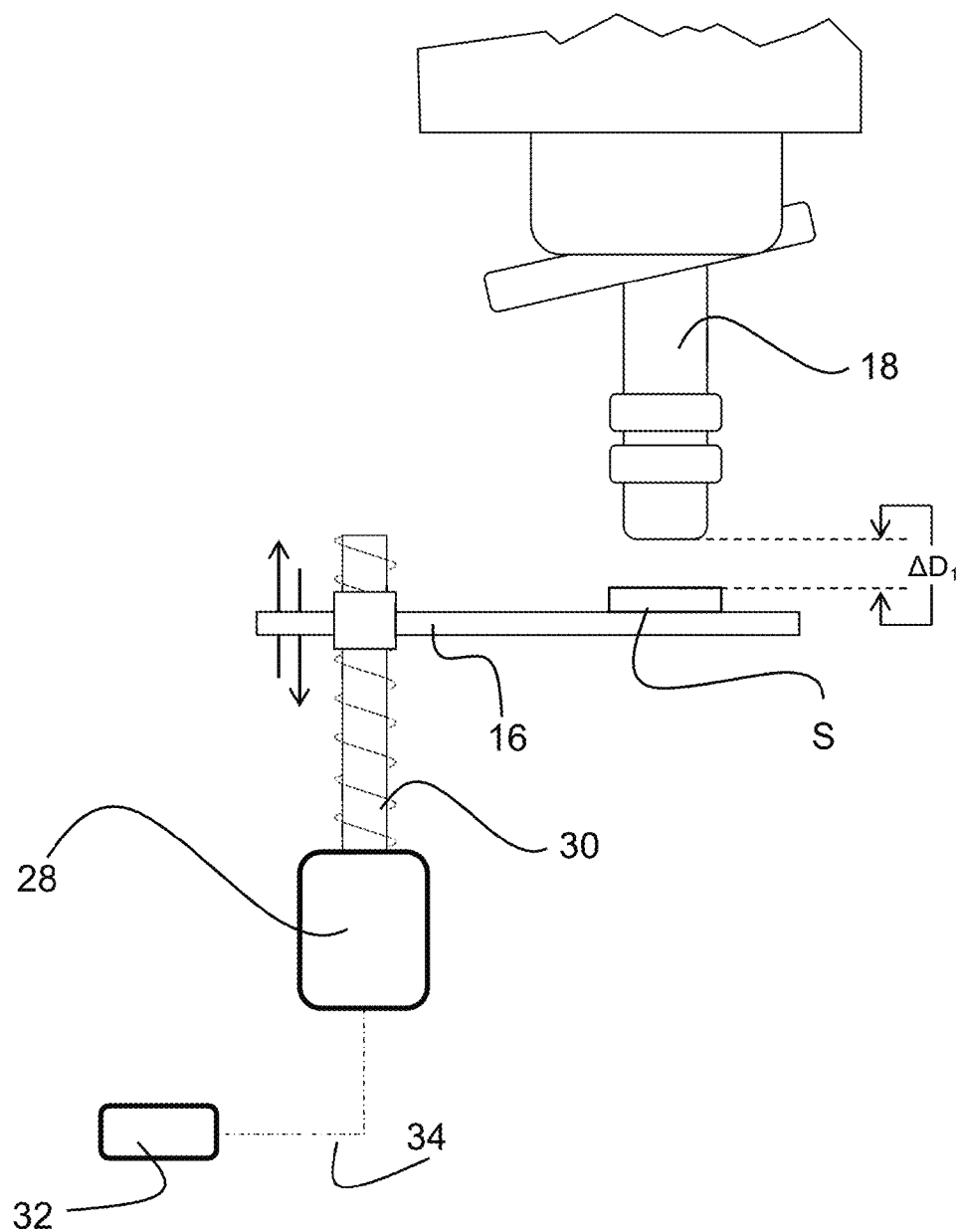
FIG. 3 is a side elevational schematic view of the objective lens, specimen and drive mechanism for the specimen stage, shown at an initial positioning in a first method of this invention.
Figure 4:
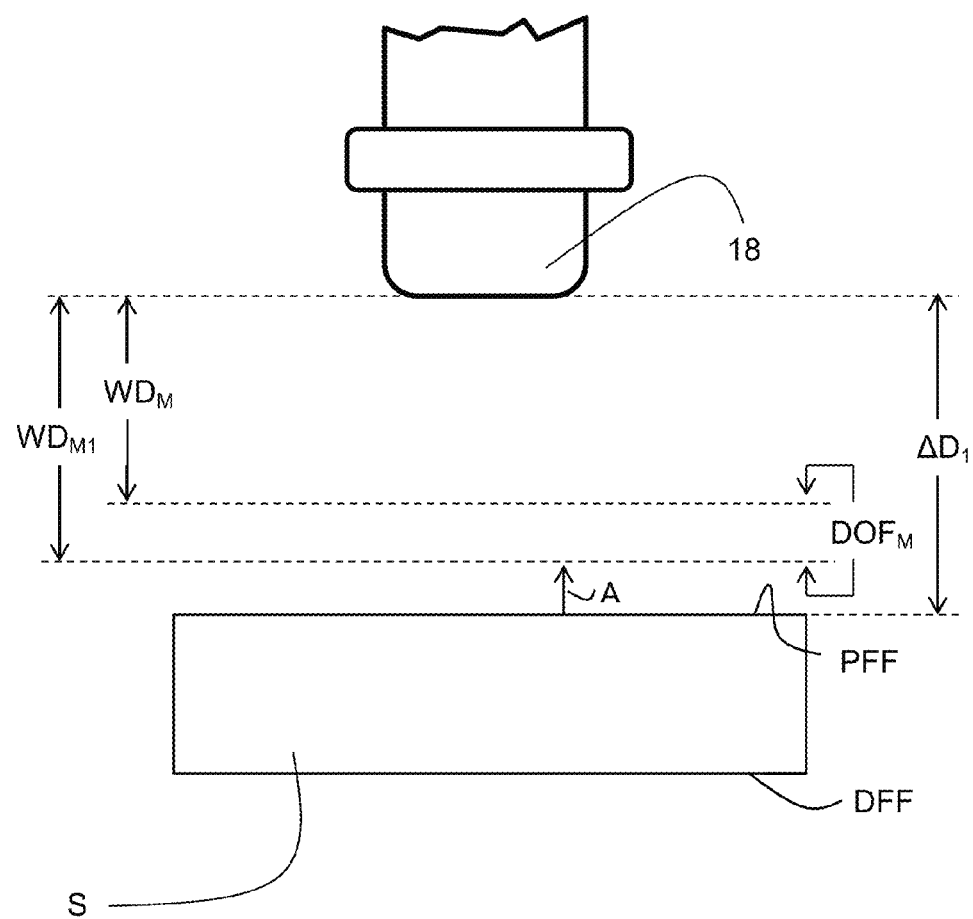
FIG. 4 is a side elevational schematic view of the objective lens and specimen at the initial position of FIG. 3

The initial positioning of the specimen S is shown in FIGS. 3 and 4, wherein the specimen stage 16 is moved by activating the motor 28 and drive mechanism 30 so that the proximal focal face PFF of the specimen S is placed at a distance $\Delta D_1$ relative to the objective lens 18 such that $\Delta D_1$ is outside of $DOF_E$. In practicing this embodiment of the present invention, this is generally achieved by placing the focal face PF at a distance $\Delta D_1$ that is greater than $WD_M$ plus $DOF_M$ plus an offset. In this way, the proximal focal face PFF is very likely outside of $DOF_E$ of the objective lens 18. Generally, because depth of focus is typically a very small distance, a very minor offset can be applied. The intent is to initially position the specimen S such that an F-stop projected onto the proximal focal face PFF will be seen as blurry (i.e., outside $DOF_E$). Although the exact distance is not critical, in particular embodiments, the initial positioning of the specimen S is such that $\Delta D_1$ is from greater than 101% of $WD_M$. In other embodiments, $\Delta D_1$ is greater than 102%, in other embodiments, greater than 103%, in other embodiments greater than 104%, and in other embodiment, greater than 105% of $WD_M$. In some embodiments, $\Delta D_1$ is from 105 to 150% of $WD_M$. Because the ratio of the DOF to WD is so small, the offset ensures that the proximal focal face PFF is outside the $DOF_E$. Of course, if the image of the F-stop projected onto the proximal focal face PFF is seen as crisp and thus possibly within $DOF_E$, the specimen S may simply be repositioned further away until the desired initial position is reached (i.e., until the proximal focal face PFF is outside of $DOF_E$).

Figure 10:
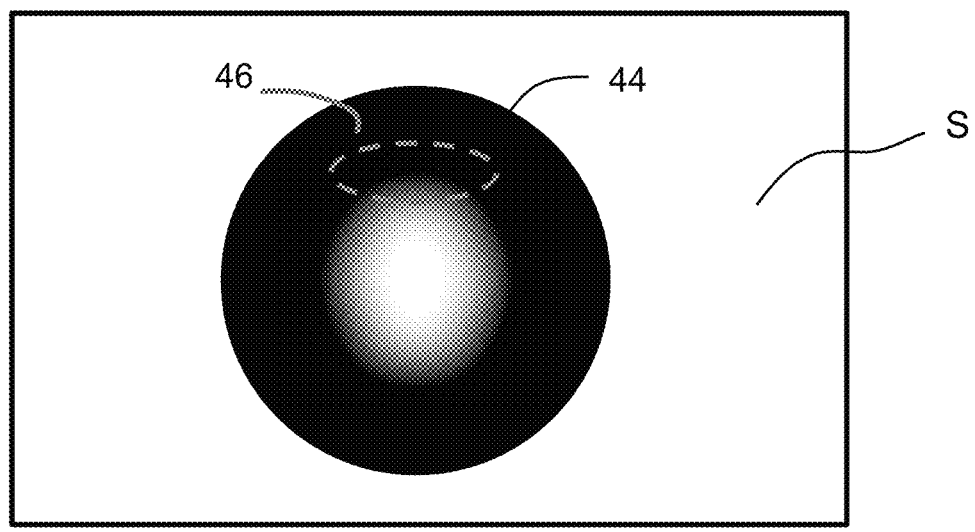
FIG. 10 is an exemplary image of a closed F-Stop projected on a transparent specimen with the F-Stop being out-of-focus.

Upon reaching this initial position as shown in FIGS. 3 and 4, the F-Stop 24 is automatically closed by motor 36, and the image of the F-stop is projected onto the specimen S (and through the specimen in the case of a transparent specimen). The projected F-Stop image (FIGS. 10, 11, numeral 44) is recorded at the image sensor 26 and analyzed by the processor 32. As shown in FIG. 10, when the F-Stop 24 is closed at position $\Delta D_1$ (i.e., outside the $DOF_E$ of the objective lens), the projected F-stop image 44 on the proximal focal face PFF of the specimen S appears with out-of-focus edges as at 46. The edges 46 are out of focus because $\Delta D_1$ is outside of $DOF_E$. In the case that the operator or processor 32 failed to place the proximal focal face PFF outside of $DOF_E$ and the projected F-stop image 44 is determined to be in focus, a further offset can be applied to ensure that the proximal focal face PFF is outside $DOF_E$.

Figure 5:
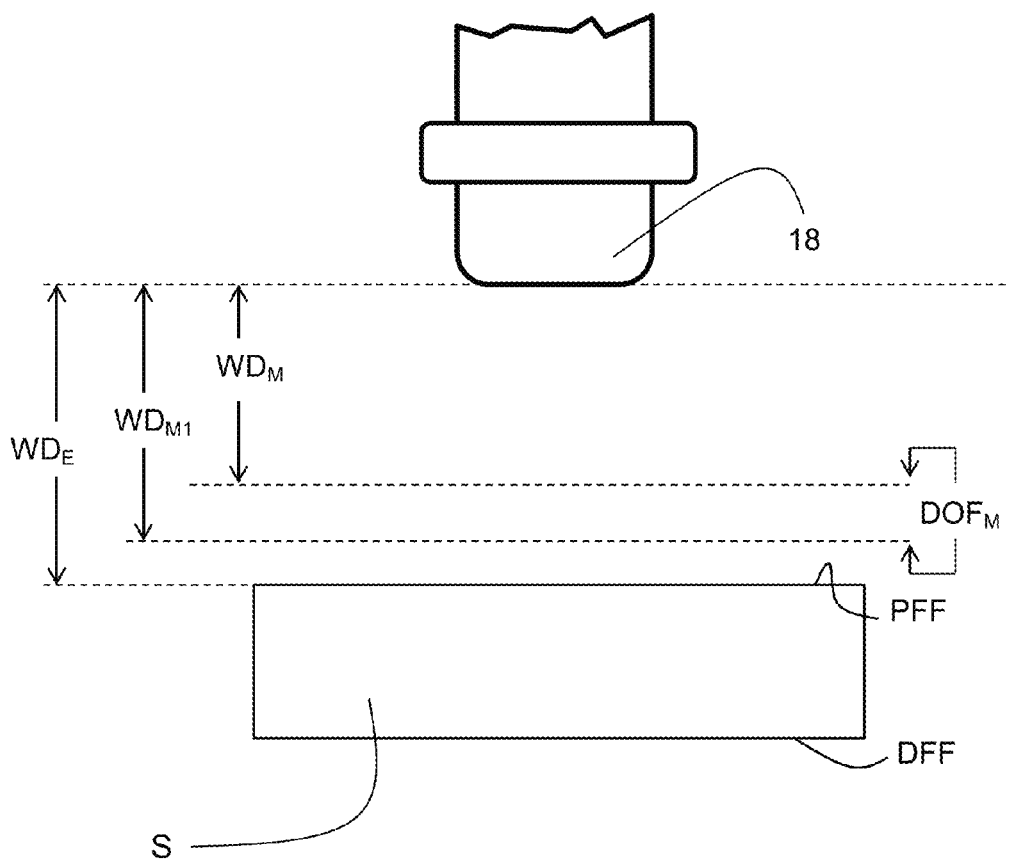
FIG. 5 is a side elevational schematic view of the objective lens and specimen of FIG. 4, but shown with the specimen moved to a position establishing an empirical working distance, $WD_{E1}$.
Figure 11:
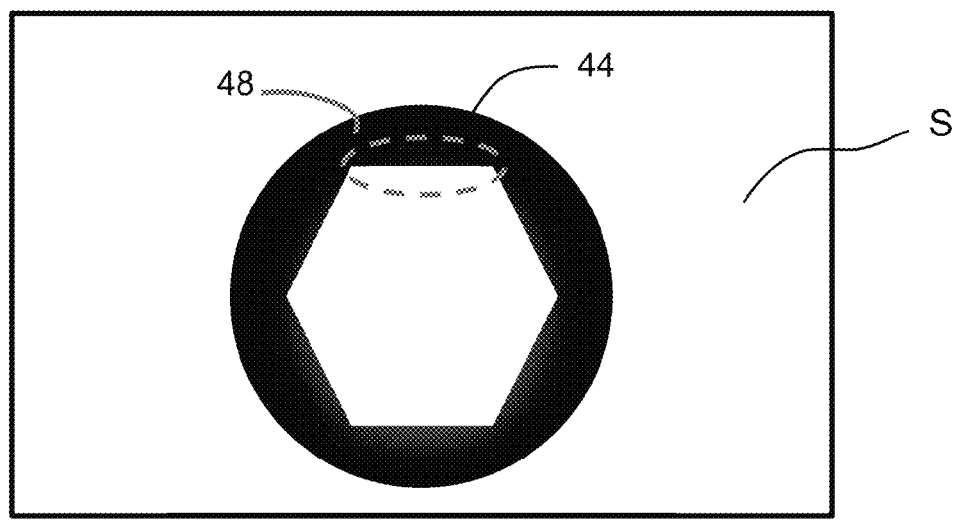
FIG. 11 is an exemplary image of a closed F-Stop projected on a transparent specimen with the F-Stop being in focus.

Immediately upon closure of the F-Stop 24 the drive mechanism 30 automatically begins to decrease the distance between the objective lens 18 and the proximal focal face PFF, i.e., decreases $\Delta D$, by moving the specimen S in the direction of arrow A, closer to the objective lens, as represented in FIG. 4. The specimen is moved until the projected F-Stop image is in-focus as illustrated in FIG. 11, where the projected F-stop image 44 on the proximal focal face PFF of specimen S appears with crisp and in-focus edges as at 48. This position, noted as $\Delta D2$, is indicative of the empirical working distance $WD_{E1}$, as seen in FIG. 5. It is noted that FIGS. 10 and 11 are referenced for each method herein, with the understanding that the focal face, whether the proximal focal face PFF or the distal focal face DFF, will be particularly defined for each method.

Figure 6:
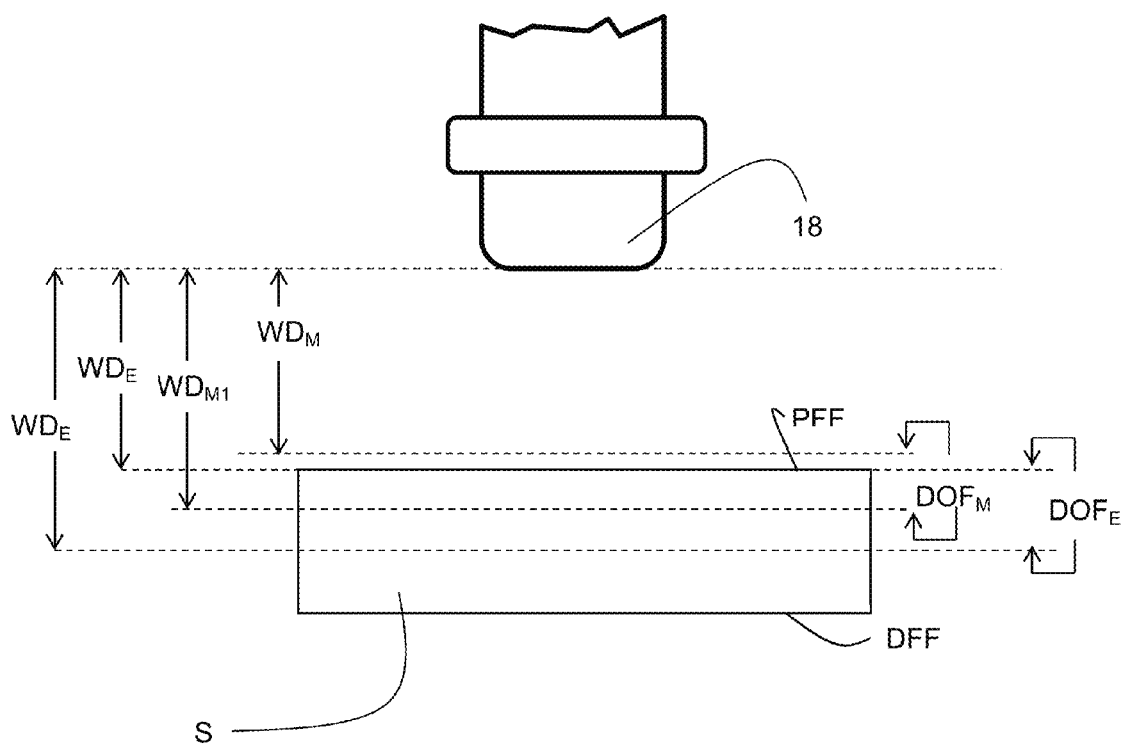
FIG. 6 is a side elevational schematic view of the objective lens and specimen as in FIGS. 4 and 5, but shown with the specimen moved to a position establishing an empirical working distance, $WD_E$.
Figure 12:
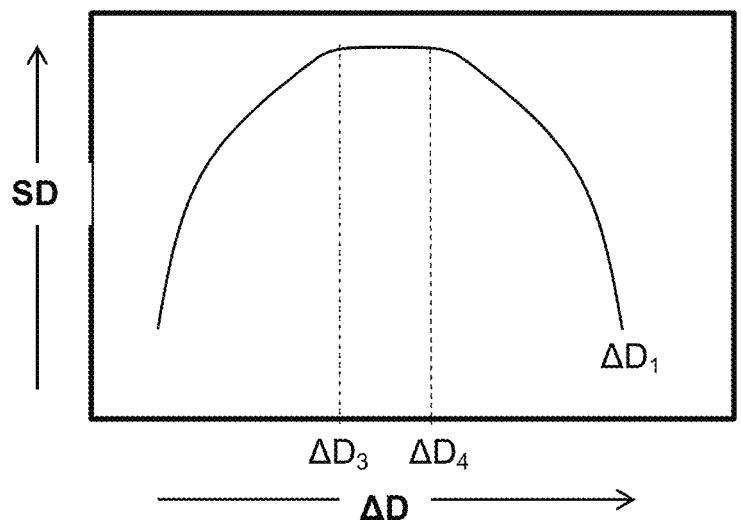
FIG. 12 is an exemplary graph showing how standard deviation of an image may be employed to determine working distances in the method of FIGS. 3-6.

In-focus images are characterized by highly defined edges (as at in-focus edges 48) around the F-Stop projected image 44. The method to define these edges is well known to those of ordinary skill in the art and is typically characterized by contrast analysis. As an example, the standard deviation SD of the image as stored on image sensor 26 would change as shown in FIG. 12. As $\Delta D$ is, in this embodiment, decreased, bringing the proximal focal face PFF closer to the objective lens 18, SD increases until a maximum occurs. At the maximum of the SD curve the projected F-Stop image 44 is in-focus. The maximum first occurs at $\Delta D2$, which will be appreciated as also being $WD_{E1}$, the position as shown in FIG. 5. The motor 28 and drive mechanism 30 continues to decrease $\Delta D$ until the projected F-Stop image 44 goes out-of-focus. This would be characterized by a decrease in SD occurring at $\Delta D3$ in FIG. 12, and $\Delta D3$ is indicative of the empirical working distance $WD_E$, as shown in FIG. 6. All of the movement, imaging and analysis is readily performed automatically by the processor 32 and related elements, such as the image sensor 26, the motor 36 and the associated adjustable F-stop 24, and the motor 28 and the associated drive mechanism 30. Upon determination of $\Delta D_3$ ($WD_E$), the F-Stop 24 is automatically opened and stage positions at $\Delta D_2$ ($WD_{E1}$) and $\Delta D_3$ ($WD_E$) are stored. Because $\Delta D2$ and $\Delta D3$ are the experimentally determined working distances $WD_{E1}$ and $WD_E$, the empirical depth of focus $DOF_E$ is readily calculated as:

$$DOF_E = (\Delta D2 - \Delta D3) = WD_{E1} - WD_E.$$

It should be appreciated that the embodiment of FIGS. 3-6 could be carried out with analysis treating the focal face as the distal focal face DFF of the specimen in cases where the specimen is transparent. The present invention contemplates this and no additional disclosure is necessary for those of ordinary skill in the art to appreciate the application of the prior method to the distal focal face DFF. The focal face simply is treated as distal focal face DFF and the same movements and analysis are performed. Those of ordinary skill in the art will be able to place the distal focal face DFF at the appropriate starting position outside of $DOF_E$, and can also take measures to prevent or account for a situation where the proximal focal face PFF of a transparent specimen resides within $DOF_E$ at the initial position.

Figure 7:
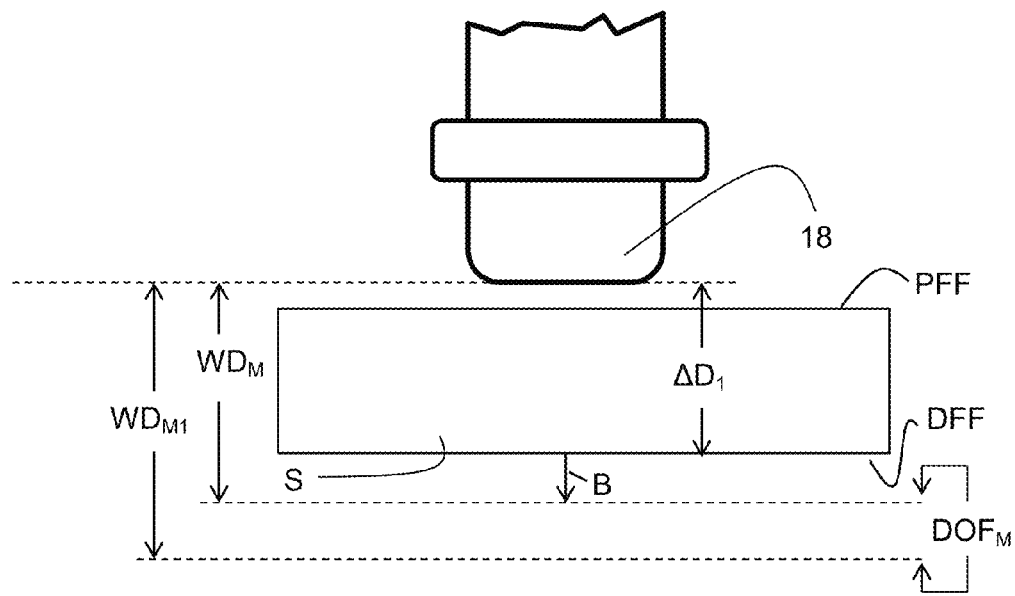
FIG. 7 is a side elevational schematic view of the objective lens and specimen at an initial positioning in a second embodiment of this invention.
Figure 8:
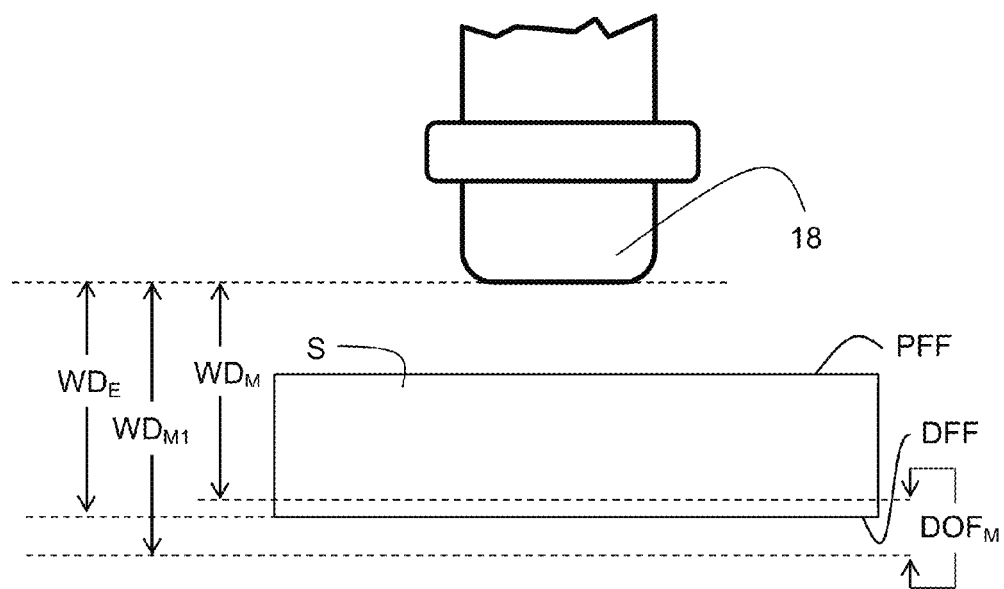
FIG. 8 is a side elevational schematic view of the objective lens and specimen of FIG. 7, but shown with the specimen moved to a position establishing an empirical working distance, $WD_E$.
Figure 9:
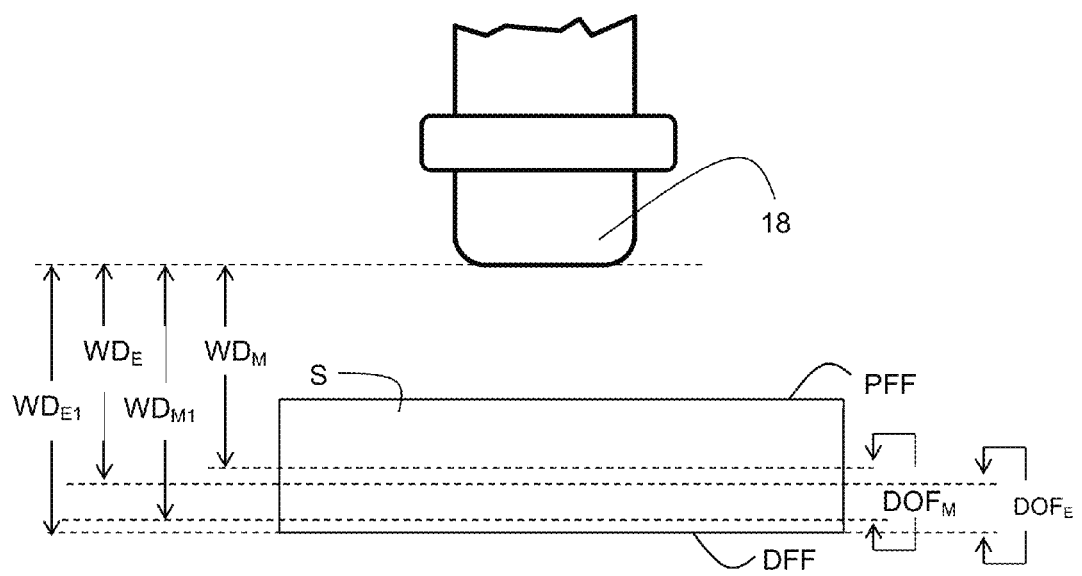
FIG. 9 is a side elevational schematic view of the objective lens and specimen as in FIGS. 7 and 8, but shown with the specimen moved to a position establishing an empirical working distance, $WD_{E1}$.

Another method is shown in FIGS. 7-9, wherein the focal face of the specimen S is the distal focal face DFF of a transparent specimen, i.e., one that allows light to pass therethrough, notably such that the light can reach the distal focal face DFF and allow the imaging thereof. The initial positioning of the specimen S is shown in FIG. 7, wherein the specimen stage (not shown) is moved by activating the motor (not shown) and drive mechanism (not shown) so that the distal focal face DFF of the specimen S is placed at a distance $\Delta D1$ relative to the objective lens 18 such that $\Delta D1$ is outside of $DOF_E$. In practicing this embodiment of the present invention, this is generally achieved by placing the distal focal face DFF at a distance $\Delta D1$ that is less than $WD_M$ minus an offset. In this way, the distal focal face DFF is very likely outside of $DOF_E$ of the objective lens 18. Generally, because DOF is typically a very small distance, a very minor offset can be applied. The intent of the initial positioning is that an F-stop projected onto the distal focal face DFF will be seen as blurry (i.e., outside $DOF_E$) at the initial position of the specimen S. Although the exact distance is not critical, in particular embodiments, the initial positioning of the specimen S is such that $\Delta D1$ is less than 99% of $WD_M$. In other embodiments, $\Delta D_1$ is less than 98%, in other embodiments, less than 97%, in other embodiments less than 96%, and in other embodiment, less than 95% of $WD_M$. In some embodiments, $\Delta D_1$ is from 50 to 95% of $WD_M$. Because the ratio of the DOF to WD is so small, this offset ensures that the distal focal face DFF is outside the $DOF_E$. Of course, if the image of the F-stop projected onto the distal focal face DFF is seen as crisp and thus possibly within $DOF_E$, the specimen S may simply be repositioned closer to the objective lens 18 until the desired initial position is reached (i.e., until the distal focal face DFF is outside of $DOF_E$).

Upon reaching this initial position as shown in FIG. 7, the F-Stop 24 is automatically closed by motor 36 and the image of the F-stop is projected onto and through the specimen S. This projected F-stop image 44 is recorded at the image sensor 26 and analyzed by the processor 32. When the F-Stop 24 is closed at position $\Delta D1$, the projected F-stop image 44 on the proximal focal face PFF of the specimen S appears with out-of focus edges as at 46, the edges being out of focus because $\Delta D1$ is outside of $DOF_E$. As previously noted this is shown in FIG. 11, which is generally applicable to all embodiments. In the case that the operator or processor 32 failed to place the distal focal face DFF outside of $DOF_E$ and the projected F-stop image 44 is determined to be in focus, a further offset can be applied to ensure that the distal focal face DFF is outside $DOF_E$.

Immediately upon closure of the F-Stop 24 the drive mechanism 30 automatically begins to increase the distance between the objective lens 18 and the distal focal face DFF, i.e., increases $\Delta D$, by moving the specimen S in the direction of arrow B, further away from the objective lens 18, as represented in FIG. 7. The specimen S is moved until the projected F-Stop image 44 is in-focus as illustrated in FIG. 12, where the projected F-stop image 44 on the distal focal face DFF of specimen S appears with crisp and in-focus edges as at 48. This is indicative of the empirical working distance $WD_E$, as seen in FIG. 8.

Figure 13:
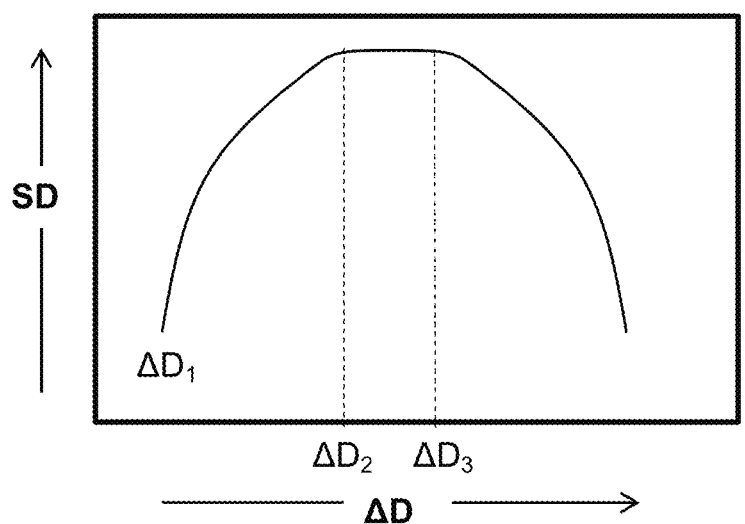
FIG. 13 is an exemplary graph showing how standard deviation of an image may be employed to determine working distances in the method of FIGS. 7-9.

The method to determine in-focus images is the same as that disclosed for the embodiment of FIGS. 3-6 and is performed automatically by standard deviation analysis. The standard deviation SD of the image as stored on image sensor 26 would change as shown in FIG. 13. As $\Delta D$ is, in this embodiment, increased, bringing the distal focal face DFF closer to the objective lens 18, SD increases until a maximum occurs. At the maximum of the SD curve the projected F-Stop image 44 is in-focus. The maximum first occurs at $\Delta D2$, which will be appreciated as also being $WD_E$, the position as shown in FIG. 8. The motor 28 and drive mechanism 30 continues to increase $\Delta D$ until the projected F-Stop image 44 goes out-of-focus. This would be characterized by a decrease in SD occurring at $\Delta D3$ in FIG. 13, and shown as $WD_{E1}$ in FIG. 9. Upon determination of $\Delta D3$ ($WD_{E1}$), the F-Stop 24 is automatically opened and stage positions at $\Delta D2$ ($WD_E$) and $\Delta D3$ ($WD_{E1}$) are stored. Because $\Delta D2$ and $\Delta D3$ are the experimentally determined working distances $WD_{E1}$ and $WD_E$, the empirical depth of focus $DOF_E$ is readily calculated as:

$$DOF_E = (\Delta D3 - \Delta D2) = WD_{E1} - WD_E.$$

It should be appreciated that the embodiment of FIGS. 7-9 could be carried out with analysis treating the focal face as the proximal focal face PFF of the transparent specimen. Additionally, in the case of an opaque or low contrast specimen, the proximal focal face PFF will have to serve as the focal face to carry out the method of FIGS. 7-9. The present invention contemplates this but no additional disclosure is necessary. The focal face simply is treated as the proximal focal face PFF and the same movements and analysis are performed. Those of ordinary skill in the art will be able to place the proximal focal face PFF at the appropriate starting position outside of $DOF_E$, and can also take measures to prevent or account for a situation where the distal focal face DFF of a transparent specimen resides within $DOF_E$ at the initial position.

From the forgoing disclosure, it should be readily appreciated that, in the case of a transparent specimen, either the proximal focal face PFF or the distal focal face DFF can be placed outside of $DOF_E$ and thereafter be brought to one of the boundaries—$WD_E$ or $WD_{E1}$—of $DOF_E$ by analyzing the clarity of the F-stop image thereon. Additionally, they may be brought to the boundary from either the upward or downward direction, In the case of an opaque, low contrast specimen, only the proximal focal face PFF is employed, but that face can be brought to either boundary—$WD_E$ or $WD_{E1}$—of $DOF_E$ from either direction. As mentioned above it should be appreciated that the methods herein could be practiced in part and in combination to empirically determine the desired $WD_E$, $WD_{E1}$ and $DOF_E$ values. Thus, one might determine one boundary of BOFE, e.g., $WD_E$, by using the proximal focal face PFF, and might thereafter determine the other boundary, $WD_{E1}$, by using the distal focal face DFF. There many combinations of movements and ways to account for the standard deviations experienced so as to determine when a boundary of the BOFE is reached by a given focal face, and the present invention is not limited to or by the specific methods taught herein for initial positioning and movement of specimens. These methods are shown as being efficient as they provide a single initial position, analyze the projected image on single focal face, and move in a consistent direction to determine the $DOF_E$.

Figure 14:
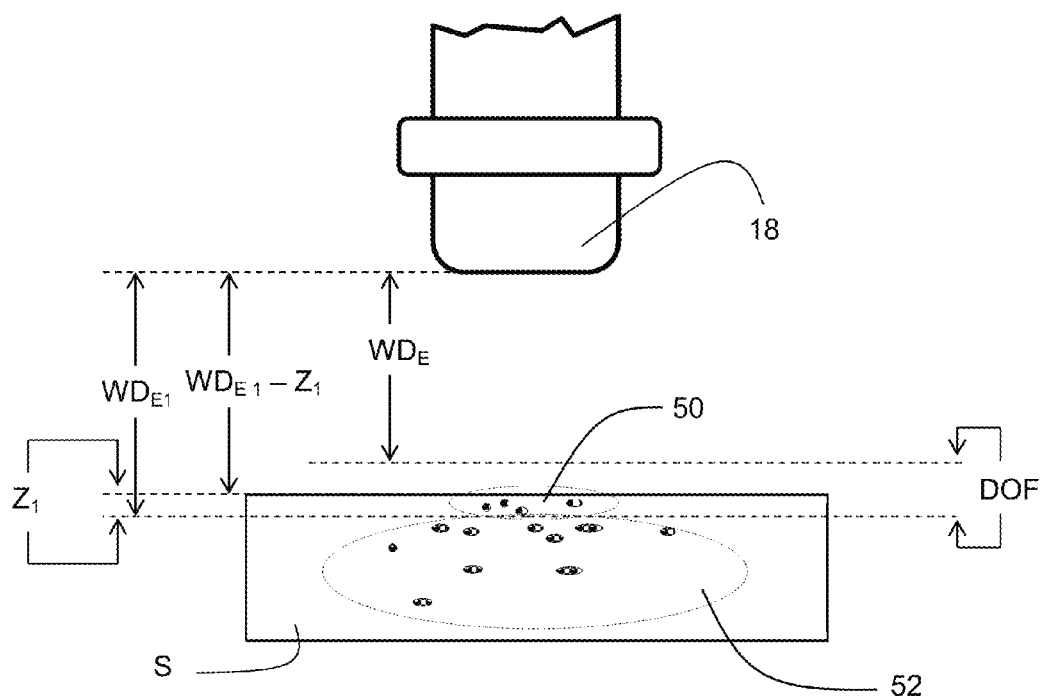
FIG. 14 is a side elevational schematic view showing how an offset from empirically determined working distances can be applied to image a particular depth of a transparent specimen.

It has already been stipulated that the present invention is particularly applicable to instances where the specimen is thicker than the depth of field of the objective lens. With such a specimen and with the values of $WD_E$ and $WD_{E1}$ known it is possible to image the specimen at a user defined depth below the proximal focal face PFF or at a user defined height above the distal focal face DFF by selectively positioning the specimen relative to the objective lens 18. In FIG. 14, the $WD_E$, $WD_{E1}$ and $DOF_E$ have already been determined as above. If the proximal focal face PFF of the specimen is brought to $WD_E$, a depth of the specimen equal to $DOF_E$ will be imaged, but, if it is desired to image a depth less than $DOF_E$, this can now be accurately accomplished in light of having empirically determined $WD_E$, $WD_{E1}$ and $DOF_E$. To image a desired depth $Z_1$ below the proximal focal face PFF, the proximal focal face PFF is placed at a distance equal to $WD_{E1}$ minus $Z_1$ from the objective lens 18. With accurate motors and drive mechanisms such as micro- and nano-positioners, it is possible to accurately image at very small depths. In the schematic illustration of FIG. 14, the specimen S is transparent and the imperfections at 50 will be in focus and thus clearly imaged, being within the established desired depth $Z_1$, while the imperfections at 52 will be out of focus. To image at a user defined height $Z_2$ above the distal focal face DFF, the distal focal face DFF can be placed at a distance $Z_2$ below $WD_E$, i.e., at $WD_E$ plus $Z_2$.

Notably, some or all of processes can be automated by the processor(s) 32. In particular embodiments, the initial positioning is carried out automatically by the processor(s) 32, either with or without user input of date. For instance, a user could supply the manufacturer's stated working distance $WD_M$, and the processor(s) 32 could move the specimen to ensure that a focal face is placed at an appropriate position $\Delta D_1$, as described above. All movement and analysis thereafter can also be performed automatically by the processor(s) 32, which control(s) the drive mechanism 30, the F-stop 24, the image sensor 26 and the contrast analysis of the image to determine when the specimen is in focus. In some embodiments, it should be appreciated that the distance between the objective lens 18 and the top surface of the stage 16 can be a known value of the system, based upon the positioning of the stage 16 by the drive mechanism 30. Thus, in one or more embodiments, the user inputs $WD_M$ and the height of the specimen S into the processor 32, and the microscope system 10 can then automatically (a) move the specimen S to an appropriate position to place the proximal focal face PFF or the distal focal face DFF at the necessary offset outside of the depth of field, (b) project the F-stop, and (c) move the specimen and monitor the standard deviation of the projected image to determine the empirical working distance values. The processor 32 can take into account the height of the specimen to determine the location of the proximal focal face PFF. The user can also enter a desired user defined depth below the proximal focal face PFF or height above the distal focal face DFF to image, and the processor 32 and associated mechanisms can move the specimen S to the proper position to accurately image that depth/height. Thus, the invention can automatically and uniquely determine the area of interest to be imaged with only the desired image depth to be entered by the operator. The automated procedure is also beneficial in that the microscope system 10 can be adapted to move the specimen laterally (as well as upwardly and downwardly) relative to the objective lens in order to image an entire specimen that is larger than one sensor image. Imaging over these larger areas would be burdensomely time consuming to be done by other non-automated means.

What is claimed is:

1. A method for empirically determining a boundary of the depth of field of an objective lens of a microscope system by employing a transparent specimen, the microscope system having a microscope, an F-stop, an image sensor, and one or more processors, the method comprising the steps of:

placing a focal face of a transparent specimen at a first position outside of the depth of field of the objective lens, wherein the focal face is chosen from a proximal focal face, relative to the objective lens, and a distal focal face, relative to the objective lens;

projecting an edge of the F-stop onto the focal face at the first position to produce an F-stop projection thereon;

effecting incremental relative movement between the specimen and the objective lens to place the focal face of the specimen at different incremental positions relative to the objective lens and projecting an edge of the F-stop to produce an F-stop projection on the focal face at said incremental positions, wherein said step of effecting incremental relative movement brings the focal face to a position at the boundary of the depth of field;

electronically imaging, with the image sensor, the F-stop projection on the focal face at the first position and the incremental positions;

performing a contrast analysis of the images of the F-stop projection on the focal face at the first position and at the incremental positions as provided by the image sensor in said step of electronically imaging, said step of performing a contrast analysis being carried out by said one or more processors and establishing when the focal face is at a position at the boundary of the depth of field.

2. The method of claim 1, wherein the depth of field has a first boundary WD and a second boundary $WD_1$, wherein WD is the shortest distance that a focal face may be from the objective lens and yet be in clear focus and $WD_1$ is the greatest distance that a focal face may be from the objective lens and yet be in clear focus, and the first position is selected to be a distance of less than 99% of WD or greater than 101% of $WD_1$.

3. The method of claim 1, wherein said step of performing contrast analysis establishes when the focal face is at a position at the boundary of the depth of field by comparison of standard deviation of the relative focus of the F-stop projection at multiple incremental positions.

4. The method of claim 1, wherein said step of projecting the F-stop is automated by said one or more processors.

5. The method of claim 1, wherein said step of effecting incremental relating movement is automated by said one or more processors.

6. The method of claim 1, wherein said step of placing is automated by said one or more processors.

7. The method of claim 1, wherein the first position is entered by a user of the microscope system.

8. The method of claim 1, wherein the objective lens has a manufacturer-stated working distance, and said first position is selected based upon the manufacturer-stated working distance, as entered by a user of the microscope system.

9. A method for imaging a transparent specimen at a defined depth below a top focal face or at a defined height above a bottom focal face, the method comprising the steps of:

empirically determining a boundary of the depth of field of an objective lens of a microscope system, the microscope system having a microscope, an F-stop, an image sensor, and one or more processors, said step of empirically determining the boundary comprising the steps of:

placing a focal face of a specimen at a first position outside of the depth of field of the objective lens, projecting the F-stop onto the focal face at the first position to produce an F-stop projection thereon, effecting incremental relative movement between the specimen and the objective lens to place the focal face of the specimen at different incremental positions relative to the objective lens and projecting the F-stop to produce an F-stop projection on the focal face and imaging the image of the F-stop projection on the focal face at said incremental positions, wherein said step of effecting incremental relative movement brings the focal face to a position at the boundary of the depth of field, electronically imaging, with the image sensor, the F-stop projection on the focal face at the first position and the incremental positions, and performing a contrast analysis of the images of the F-stop projection on the focal face at the first position and at the incremental positions as provided by the image sensor in said step of electronically imaging, said step of performing a contrast analysis being carried out by said one or more processors and establishing when the focal face is at a position at the boundary of the depth of field; and placing a focal face of the transparent specimen within the depth of field based upon the boundary of the depth of field determined in said step of determining a boundary.

10. The method of claim 9, wherein the depth of field has a first boundary WD and a second boundary $WD_1$, wherein WD is the shortest distance that a focal face may be from the objective lens and yet be in clear focus and $WD_1$ is the greatest distance that a focal face may be from the objective lens and yet be in clear focus, and said step of placing a focal face of the transparent specimen with the depth of field includes either placing the top focal face closer to the objective than $WD_1$ or placing the bottom focal face further away from the objective than WD.

11. A microscope system comprising:
a stage holding a transparent specimen,
an illumination source,
an objective lens,
a motorized F-stop,
a drive mechanism operable to change the relative position between the specimen and objective lens,
an electronic image sensor,
means to determine the relative focus of the transparent specimen at a given relative position between the transparent specimen and the objective lens, said means including said motorized F-stop and means to determine a first empirical working distance, $WD_E$, wherein $WD_E$ is the closest distance between a focal face of the transparent specimen and the objective lens when that focal face is in focus, as determined by said means to determine the relative focus, means to determine a second empirical working distance, $WD_{E1}$, wherein $WD_{E1}$ is the furthest distance between a focal face of the transparent specimen and the objective lens when that focal face is in focus, as determined by said means to determine the relative focus, one or more processors controlling the stage, the motorized F-stop, the drive mechanism, and the image sensor, and effecting said means to determine the relative focus, said means to determine $WD_E$ and means to determine $WD_{E1}$, wherein said one or more processors are capable of controlling the motorized F-stop so as to project an edge of the F-stop onto the transparent specimen so as to be imaged by the electronic image sensor, and said one or more processors are capable of performing contrast analysis of images of the edge of the F-stop projected onto the transparent specimen, and means to enter a user-defined depth below a focal face or user-defined height above a focal face to be imaged, said one or more processors adapted to move the transparent specimen to an appropriate position to image at said user-defined depth below or height above a focal face, said appropriate position being based on either $WD_E$ or $WD_{E1}$.

12. The microscope system of claim 11, further comprising:
means to store a given relative position of the specimen to the objective lens, electronically image the specimen at that relative position and store information respecting the relative focus at that relative position.

13. The microscope system of claim 11, further wherein said means to determine $WD_E$ and $WD_{E1}$ employ a standard deviation analysis of the relative focus determined by said means to determine the relative focus.

14. The microscope system of claim 11, further comprising an input device communicating with said processor to permit user input of data.

* * * * *